April 23, 1940.   R. S. SANFORD ET AL   2,198,129
FLUID PRESSURE MECHANISM
Original Filed Jan. 23, 1936
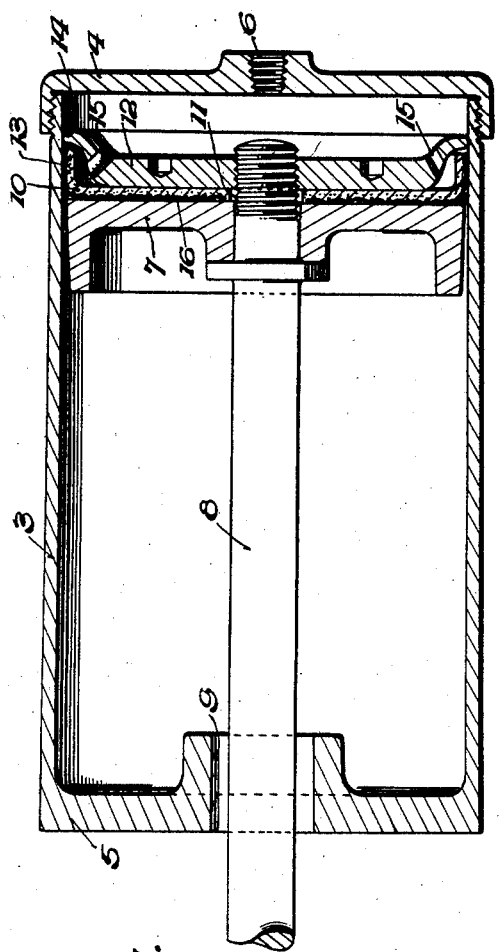
INVENTORS
Roy S. Sanford
BY William J. Andres
N. D. Parker Jr.   ATTORNEY Patented Apr. 23, 1940

2,198,129

UNITED STATES PATENT OFFICE 2,198,129

FLUID PRESSURE MECHANISM

Roy S. Sanford and William J. Andres, Pittsburgh, Pa., assignors to Bendix-Westinghouse Automotive Air Brake Company, Pittsburgh, Pa., a corporation of Delaware Original application January 23, 1936, Serial No. 60,504. Divided and this application June 21, 1937, Serial No. 149,504

5 Claims. (Cl. 309—7)

This invention relates to piston structure and packing therefor, and more particularly to an improved type of construction suitable for use in connection with fluid pressure actuators.

In piston and cylinder arrangements for actuating various devices, as for example, the clutch lever or brake lever of an automotive vehicle, it has heretofore been proposed to position the cylinder generally in a horizontal plane, and, due to the angular movement of the actuated lever connected thereto, it has been necessary to construct the parts in such manner as to permit of a slight lateral movement of the piston rod during its reciprocating movements. With such prior constructions, however, due to the rocking of the piston and the weight of the latter, it has been found that the piston sealing cup is subject to great wear at the bottom of the cylinder and in a relatively short space of time becomes distorted to such a degree that efficient sealing of the actuating fluid supplied the cylinder is no longer obtained.

It is accordingly one of the objects of the present invention to provide in a structure of the above character, a novel piston assembly which shall be so constituted as to avoid these disadvantages.

Another object is to provide a piston assembly which is capable of a limited degree of rocking movement without causing excessive wearing of the piston sealing cup.

Still another object is to provide a novel flexible sealing cup for a piston which shall be provided with a metallic wearing surface in order that the life of the cup will be greatly increased over those heretofore used.

Another object is to provide a sealing cup which shall be flexible in nature and while retaining the fluid-sealing characteristics of rubber and/or similar flexible composition materials yet have the characteristics of the long wearing ability of metal cups.

A further object is to so form a flexible composition sealing cup that the wearing surface thereof will be composed of metallic screen cloth and rubber or other similar material.

A still further object is to provide a piston and cup assembly which shall be relatively simple in construction as well as economical of manufacture, and at the same time being capable of efficient operation over a long period of time.

Other objects and novel features of the invention will appear more fully hereinafter from the following detailed description when taken in connection with the accompanying drawing illustrating a preferred embodiment of the invention. It is to be expressly understood, however, that the drawing is employed for purposes of illustration only and is not designed as a definition of the limits of the invention, reference being had for that purpose to the appended claims.

In the drawing, wherein similar reference characters refer to like parts throughout the several views:

Fig. 1 is an axial sectional view of a piston and cylinder arrangement constructed in accordance with the principles of the present invention, and Fig. 2 is a fragmentary view in perspective of the piston cup of Fig. 1.

In the illustrated embodiment of the invention, the piston and cylinder arrangement is constituted by a cylinder 3 provided with end walls 4 and 5. The end wall 4 has an opening 6 therein for connection with any suitable source of fluid power for actuating the piston.

Within the cylinder 3, there is disposed a piston 7 which is of lesser diameter than the interior wall of the cylinder, the said piston being secured to a piston rod 8, which latter extends through an enlarged opening 9 in the end wall 5 and is connected to any suitable type of device to be actuated, not shown. A flexible fluid-sealing piston cup 10 having a centrally-disposed aperture 11 is maintained in position against the piston 7 by means of a follower plate 12, the latter being threadedly received by the end of the piston rod 8 within the cylinder and forced tightly into engagement with the fluid-sealing cup. As will be clear from Fig. 1, the cup 10 is provided with a flanged portion 13, directed toward the pressure side of the assembly and which is in fluid-sealing engagement with the interior of the cylinder 3 at all times, thus effectively sealing one side of the piston assembly from the other.

In instances where the piston rod 8 is connected to actuate an angularly-movable lever, such as the clutch lever or brake lever of an automotive vehicle, the enlarged opening 9 permits of the slight required lateral movement of the piston rod 8 during reciprocation thereof in opposite directions. It will be noted from Fig. 1 that due to the fact that the diameter of piston 7 is less than the internal diameter of cylinder 3, the piston 7 will be out of engagement at all times with the wall of the cylinder. In order, therefore, to provide a suitable support for the piston, while at the same time materially decreasing the wear on the piston cup 10 and any liability of distortion of the later, the plate 12 is provided with a spherical or rounded peripheral portion 14 which maintains at all times a line contact with the interior wall of the cylinder. This is due to the fact that the peripheral portion of the plate is a portion of a sphere, the diameter of which is substantially equal to the bore of the cylinder 3. The thickness of the portion 14 of the plate is moreover such as to insure the aforesaid line contact within the limits of rocking movement of the piston. This portion 14 is positioned closely adjacent the flange 13 of the sealing cup 10 and thus enables the above referred to slight rocking movement of the piston assembly without undue distortion of the cup. In order to subject the flanged portion 13 of the piston cup to the actuating fluid for sealing purposes, the plate 12 is provided with a plurality of apertures 15.

In flexible sealing cups heretofore provided, considerable difficulty has been encountered in providing a cup which combines the characteristics of efficient fluid sealing with long life. Various rubber and rubber-like composition materials heretofore employed have been efficient as to sealing when initially installed but have necessitated frequent replacements due to wearing of the cup and consequent leakage. By the present invention, it is proposed to employ a metallic wearing member in the form of a metallic wire screen cloth 16 embedded in the exterior surface only of the sealing cup. Such metallic screen cloth may take the form of woven brass wire, for example, but it is understood that different types of metal may be employed in order to secure the wearing qualities contemplated.

Preferably, in forming the cup 10, the metallic screen 16 is preformed into a shape conforming with the finished cup. Thereafter the screen is placed within a suitable mold and the rubber or other composition, in molten condition, is forced into the mold with such pressure that the interstices of the cloth are completely filled with the composition. The resultant product is then vulcanized in a well known manner. As will be readily appreciated from an inspection of Fig. 2, the outer surface of the resultant structure presents a combined composition and metallic surface which is perfectly smooth. The use of the metallic cloth employed herein not only materially increases the life of the sealing cup without sacrificing the characteristics of flexibility and efficient sealing but moreover decreases the friction between the cup and cylinder in which it operates.

While the invention has been described herein with considerable particularity, it will be understood that the same is not limited to the form shown but may take other forms as will be understood by those skilled in the art. Reference will therefore be had to the appended claims for a definition of the limits of the invention.

This application is a division of our application filed January 23, 1936, Serial No. 60,504, entitled Fluid pressure mechanism.

What is claimed is:

1. A cylinder and piston construction comprising a cylinder having an end wall provided with an opening for fluid, a piston in said cylinder, said piston being of lesser diameter than the internal diameter of the cylinder and having a piston rod, a second end wall provided on said cylinder and having an enlarged opening through which said rod extends, a flexible piston cup having its peripheral portion in fluid-sealing engagement with the interior of said cylinder, a follower plate having a peripheral portion adapted to maintain a line contact with the interior of the cylinder adjacent the peripheral portion of said cup and in a plane perpendicular to the axis of the cylinder during longitudinal and angular movement thereof in the cylinder, and means for securing said piston, cup and plate in rigid assembled relation on said piston rod.

2. A cylinder and piston construction comprising a cylinder having an end wall provided with an opening for fluid, a piston in said cylinder, said piston being of lesser diameter than the internal diameter of the cylinder and having a piston rod, a second end wall provided on said cylinder and having an enlarged opening through which said rod extends, a piston cup having its peripheral portion in fluid-sealing engagement with the interior of said cylinder, a follower plate having a spherical portion engaging the interior of the cylinder adjacent the peripheral portion of said cup and cooperating with said cylinder to support said piston rod, piston and cup for universal movement with respect to said cylinder, and means for securing said piston, cup and plate in rigid assembled relation on said piston rod.

3. In combination, a cylinder having oppositely-disposed end walls, a piston in said cylinder, a fluid-sealing cup attached to said piston, a follower plate rigidly secured to said cup and piston and having an outer surface so constituted as to provide a line contact with the interior of said cylinder in a plane perpendicular to the axis thereof during angular and longitudinal displacement of said plate therein, said plate being formed with a plurality of apertures therein, one end wall being provided with an opening for fluid, and a piston rod secured to said piston, said second end wall being provided with an opening through which said rod extends, said opening permitting an appreciable degree of lateral movement of said rod with respect to said cylinder.

4. A fluid pressure device comprising a cylinder adapted to receive a fluid, a piston therein of lesser diameter than the bore of said cylinder, a piston rod secured to said piston and positioned for slight lateral movement with respect to said cylinder, a piston cup carried by said piston rod, and means comprising a plate having a spherical portion engaging the interior of said cylinder and cooperating therewith for supporting said piston for universal movement therein, said plate being rigidly secured to said piston rod and maintaining said cup against said piston.

5. A fluid pressure device comprising a cylinder adapted to receive a fluid, a piston therein of substantially lesser diameter than the bore of said cylinder, a piston rod secured to said piston and positioned for lateral movement with respect to said cylinder, a piston cup carried by said piston rod, and means comprising a plate having a spherical portion of a diameter substantially equal to that of the cylinder bore and in engagement with the surface thereof for supporting the piston for longitudinal movement therein and angular movement about the center of said spherical portion, said plate being rigidly secured to said piston rod and maintaining said cup against said piston.

ROY S. SANFORD.
WILLIAM J. ANDRES.